Figure 1:
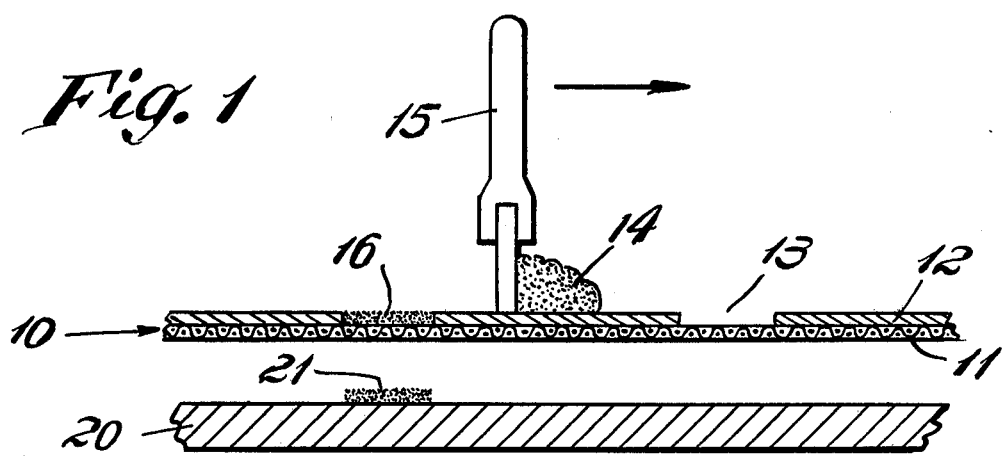

United States Patent [19]

Newman et al.

[11] 4,042,401

[45] Aug. 16, 1977

[54] HECTOGRAPH PRODUCTS AND PROCESS

[75] Inventors: Douglas A. Newman, Glen Cove; Robert T. Emerson, Manhasset, both of N.Y.

[73] Assignee: Columbia Ribbon and Carbon Manufacturing Co., Inc., Glen Cove, N.Y.

[21] Appl. No.: 553,134

[22] Filed: Feb. 26, 1975

Related U.S. Application Data

[63] Continuation-in-part of Ser. No. 312,736, Dec. 6, 1972, abandoned.

[51] Int. Cl.$^2$ .................... B41M 1/12; C09K 3/00
[52] U.S. Cl. .................... 106/14.5; 101/129; 106/19; 106/26; 106/27; 106/31; 106/32; 106/191; 106/271
[58] Field of Search .................... 106/19, 14.5, 26, 27, 106/31, 32, 191, 271; 101/468–473, 129; 427/144, 143, 146, 153

[56] References Cited

U.S. PATENT DOCUMENTS

| 3,036,924 | 5/1962 | Newman | 106/14.5 |
|---|---|---|---|
| 3,177,086 | 4/1965 | Newman et al. | 106/26 X |
| 3,207,621 | 9/1965 | Newman et al. | 427/144 |
| 3,459,581 | 8/1969 | Newman | 427/144 |
| 3,751,318 | 8/1973 | Newman | 101/470 |
| 3,931,443 | 1/1976 | Neale et al. | 101/469 |

*Primary Examiner*—J. Ziegler
*Attorney, Agent, or Firm*—Thomas L. Tully

[57] ABSTRACT

Novel thixotropic hectograph printing ink and process for printing hectograph master sheets or transfer sheets therewith comprising preparing a semi-solid, thixotropic hectograph printing ink containing non-drying semi-solid oleaginous material, film-forming binder material at least partially dissolved in a relatively high boiling organic solvent having dispersed therein hectograph dyestuff and finely-divided fusible, waxy particles, printing the hectograph composition in image form onto a master sheet or as a continuous or spot layer on a foundation and heating such as by means of infrared radiation to heat the composition to a temperature above the melting point of the waxy particles to fuse the composition and render it smooth, smear-resistant and stable.

9 Claims, 2 Drawing Figures

HECTOGRAPH PRODUCTS AND PROCESS

This application is a continuation-in-part of parent application Ser. No. 312,736, filed Dec. 6, 1972 now abandoned.

The most conventional hectograph compositions are applied as hot-melt wax compositions or resinous solvent compositions to form pressure-sensitive hectograph transfer sheets carrying a layer of wax and/or resin composition containing undissolved hectograph dyestuff which is transferable in image form to a master sheet under the effects of writing or typing pressure. The images formed on the master sheet are relatively soft and contain exposed dye crystals and/or dye-dissolving oils and cannot be handled or rubbed without dislodging portions of the dyestuff but this generally is no problem because the imaged master is usually used immediately in the spirit duplicating process and then discarded.

It is also known to print hectograph masters directly, such as by crash imprinting, using a hectograph printing ink comprising a hot-melt wax composition containing undissolved dyestuff. The images printed with such compositions are relatively soft and smear during handling or as a result of abrasion against contacting sheets, such as when such printed masters are bound in book form for school use. Also, with crash printing, it is only possible to print images and it is not possible to print large areas such as required for the production of transfer sheets such as spot carbons and full carbons.

It is the principal object of the present invention to provide printed hectograph compositions, such as images and transfer layers, which are cleaner to the touch and more abrasion-resistant and stable then prior known hectograph compositions.

It is another object of this invention to provide hectograph printing inks which are capable of being printed onto a master sheet in the "silk screen" printing process to provide smooth hectograph images which have improved rub-resistance and bleed-resistance and provide a large number of intense copies in the spirit duplicating process.

It is another object of this invention to provide a novel printing method for improving the cleanliness, rub-resistance and copy capacity of hectograph compositions printed from a hectograph printing ink.

It is another object of this invention to provide a novel ink system for the silk screen process in which the ink is solvent-dispersible and thus can easily be cleaned from a screen after use.

Figure 2:
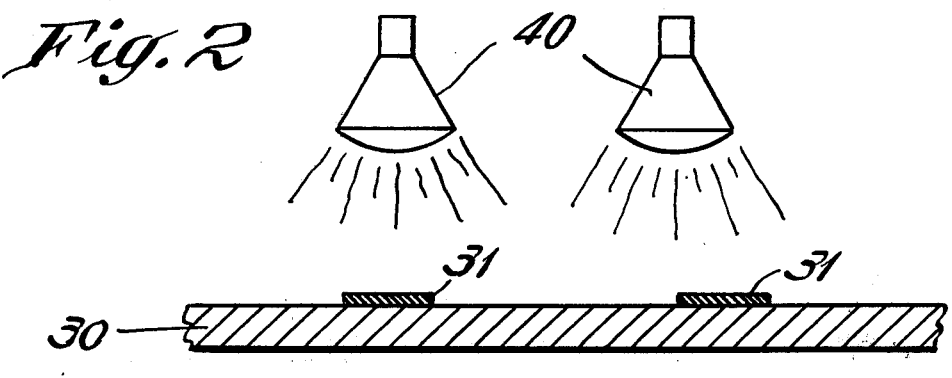

These and other objects and advantages of the present invention will be apparent to those skilled in the art in the light of this disclosure including the drawing, in which:

FIG. 1 is a diagrammatic cross-section, to an enlarged scale, of a master sheet being imaged with hectograph printing ink through a stencil sheet, the sheets being shown out of contact for purposes of illustration, and FIG. 2 is a diagrammatic cross-section, to an enlarged scale, of a master sheet carrying printed hectograph images which have been fused by means of infrared radiation.

The objects and advantages of the present invention are accomplished through the use of novel hectograph printing ink compositions and by the novel process of fusing the hectograph images which have been printed onto the master sheet.

The silk screen printing process is a generic name for a stencil printing process employing an ink-permeable screen which may be of silk, nylon, polyester stainless steel or other monofilament or polyfilament thread construction. Portions of the screen are treated or masked to render them impermeable to ink to provide a stencil in which the remaining ink-permeable areas correspond to the images or areas to be printed. The stencil screen is placed above and closely spaced from a copy sheet and the printing ink is drawn across the top of the screen, such as by means of a squeegee, to force the stencil sheet against the copy and squeeze the ink through the ink-permeable areas and onto the copy sheet. The printed copy sheet is dried by evaporation of the volatile vehicle. The process can be repeated with a number of fresh sheets to produce a number of copies from the same stencil screen by repeating the inking step.

Conventional screen printing inks are prepared by grinding strong insoluble pigments into a vehicle composed of dehydrated castor oil, synthetic resin, boiled linseed oil and solvent such as kerosene or solvent naphtha to provide a short ink which will run over the screen easily and will permit easy separation of the screen and the printed copy.

The novel hectograph printing ink compositions of the present invention comprise from about 30% to 80% by weight of volatile organic liquid vehicle having a boiling point above about 200° F and from 20% to 70% by weight of solids, some of which are dissolved and some of which are dispersed in the vehicle. The solids comprise hectograph dyestuff, hard waxy material having a melting point above 140° F, film-forming binder material, non-drying oleaginous material and, preferably, an infrared radiation-absorbing material.

The volatile organic solvent vehicle of the printing ink consists of one or more liquids of relatively low volatility, such as naphtha, mineral spirits, kerosene, toluene, xylene, or the like, having boiling points of between about 200° F and 460° F.

The hectograph dyestuff, which preferably comprises from more than about 50% by weight up to about 85% by weight of the solids content, is present in the ink in the form of fine dispersed crystals, with a small portion being incidentally dissolved by the vehicle. Suitable dyestuffs include all of the conventional spirit-soluble hectograph dyestuffs such as crystal violet, methyl violet, Malachite green, and the like, as well as the conventional spirit-soluble, substantially colorless color-forming materials such as crystal violet lactone and other color precursors which react with a complementary color-forming material present in the duplicating fluid or on the copy sheets to form colored images.

The binder material of the hectograph ink comprises a combination of a minor amount by weight of a film-forming material, which is at least partially soluble in the system so as to impart viscosity to the ink, and a major amount by weight of one or more hard waxy materials which are dispersed in finely-divided particulate form in the ink system. The film-forming material preferably comprises from about 2% to about 15% by weight of the solids content and preferably is a cellulosic material such as ethyl cellulose, hydroxyethyl cellulose, ethyl hydroxyethyl cellulose, or the like, but other suitable film-formers may be selected depending upon the solvent system selected (e.g. for fast or slow drying, etc.). The finely-dispersed hard waxy material may comprise from about 5% up to about 20% by weight of the solids content and preferably is carnauba wax, although other hard waxes such as montan wax, hard microcrystalline wax, ouricury wax and other waxy materials having a melting point above about 140° F and below about 300° F are also suitable, such as polyethylene, silicone gums, and the like.

The present compositions also comprise from about 5% by weight up to about 20% by weight of a non-drying semi-solid oleaginous material which may be soluble or insoluble in the volatile vehicle and which is at least partially incompatible with the hard wax in the cold. The oleaginous material preferably is a semi-solid material having a melting point below about 185° F so as not to bleed from the hectograph composition after printing. Among the suitable semi-solid oleaginous materials are animal fats such as lanolin and lard, soft mineral waxes such as petrolatum and Bareco Micro Pet Amber B, hydrogenated vegetable oils such as hydrogenated castor oil, fatty acid esters such as the methyl ester of 12-hydroxy stearic acid, and the like. All of these suitable materials are soft solids at ordinary room temperatures, i.e. about 75° F, and liquefy at a temperature below about 185° F. Liquid oils and plasticizers may be used in combination with the semi-solid material, such as mineral oil, animal oils such as lard oil, butyl stearate, and the like, provided that they do not dissolve the dyestuff to any substantial degree and are present in lesser amounts than the semi-solid material and are compatible therewith so as to form non-flowable mixtures.

The oleaginous material functions to increase the amount of dyestuff which can be leached from the hectograph images in the spirit duplicating process. Thus it retards the formation of a hardened tar or crust of the dyestuff at the surface of the images during the duplicating process, which tar or crust tends to be formed when a large amount of dyestuff is exposed to the spirit duplicating fluid. Such a tar or crust of dye has poor solubility in the spirit fluid and produces fewer and less intense copies. The oleaginous material is at least partially incompatible with the waxy material in the amounts used, and separates therefrom after fusion to provide a heterogeneous combination of waxy material and oleaginous material at the surface of and within the fused images. This structure permits the dyestuff to be dissolved gradually from the images, preventing tarring, and providing a large number of intensely colored spirit copies. The master images are clean to the touch because the oleaginous material preferably is substantially a non-solvent for the dyestuff and thus is free of dyestuff. Since the oleaginous material is a semi-solid material, it may be capable of dissolving some small amount of the dyestuff and will still provide relatively clean images because the semi-solid materal is not fluid and will not exude from the images to stain the hands or form dye-containing halos on the master sheet.

According to a preferred embodiment, the present hectograph ink compositions contain a material capable of absorbing substantial amounts of infrared radiation. Such material may be a conventional black pigment such as a carbon black dispersed in the ink, or a conventional infrared-absorbing compound, commercially available for the purpose, dissolved or dispersed in the ink. Suitable amounts vary with the effectiveness of the material. Carbon black or similar black pigment may be used in an amount ranging from about 0.5% up to about 5% by weight of the solids content. Commerically available infrared absorbers are effective in smaller amounts down to about 0.1% by weight but are expensive.

Basically the present hectograph ink compositions are thixotropic compositions which are semi-solid and only slowly-flowable, if at all flowable, at ordinary room temperatures, but which flow readily when moved, and comprise a dispersion of wax particles and hectograph dyestuff in a volatile organic vehicle containing a semi-solid oleaginous material, which is at least partially incompatible with the wax, and a film-forming binder materal. The present compositions have a solids content of between about 20% and 70% and the dispersed materials, namely wax and dye and possibly carbon black, are sufficiently fine to pass through the openings of a conventional silk screen stencil, i.e. smaller than about 10 microns for the wider mesh screens and preferably smaller than about 5 microns for screens down to about 250 mesh. This thixotropic, semi-solid ink is relatively stable at room temperatures, will not flow in the absence of applied motion, will not rapidly dry in the absence of applied heat, will not harden on the silk screen or stencil and will not clog or plug the openings therein, and will not flow on the master sheet.

One embodiment of the present process is carried out in the manner illustrated by the drawings whereby a stencil sheet 10, such as silk screen 11 covered by an impervious masking layer 12 except in open areas 13 corresponding to the images to be copied, is positioned against a conventional master sheet 20. An infrared radiation-absorbing thixotropic hectograph ink composition 14 is drawn across the barrier layer 12 by means of a conventional squeegee 15 whereby portions 16 of the ink are forced into open areas 13, through the silk screen 11 and against the surface of the master 20 to form printed ink images 21 thereon corresponding to the open areas of the stencil sheet 10.

Next the stencil sheet 10 is carefully separated from the master sheet 20 carrying ink images 21 and the latter is exposed to light sources 40 rich in infrared radiation and preferably to a flow of warm air. The ink images 21 selectively absorb the infrared radiation while the master sheet 20, such as white paper, does not absorb the radiation to any substantial extent.

As shown by FIG. 2, the final imaged master sheet 30 comprises fused hectograph images 31.

The use of infrared radiation-absorbing compositions, in association with the use of infrared radiation to cause fusion of the printed images, is a preferred embodiment of the present invention. The heating of the printed images accomplishes not only the evaporation of the volatile vehicle but also the melting and coalescence of the hard wax particles and the plasticizing of the wax by means of the oleaginous material. The images are heated above the melting point of the waxy material, but the images do not flow or spread during fusion because the master sheet itself is not heated by the infrared radiation. This is important because any spreading or broadening of the master images is compounded on each of the duplicate copies produced from the master in the spirit duplicating process.

However, it is also possible to dry and fuse the present hectograph images or compositions by other conventional mean such as hot plate and/or by heated air provided that the heating is carefully controlled in order to prevent excess melting and spreading of the images or composition being dried.

The printed images 21, shown in FIG. 1, comprise the wax particles and dye crystals held together by means of the film-forming binder material. At this stage the imaged master sheet could be dried at non-fusion temperatures and used in the spirit duplicating process to produce suitable copies. However the master images have a rough particulate surface and smear and transfer easily if contacted by the hands or by a contacting sheet. This disadvantage is overcome by the fusion drying technique which converts the printed images 21 into fused images 31. In the fused images 31 the waxy particles have been melted or coalesced together with the oleaginous material and the dye crystals to form a composition from which the oleaginous material will not bleed and which releases the dyestuff more gradually and evenly in the spirit duplicating process.

Furthermore the fused images 31 have smooth, abrasion-resistant surfaces which, apparently due to the presence of fused wax thereover, can be handled and used in book form with a minimum of dye transfer to the hands or to the rear surface of the next contacting sheet in the book.

The following examples are given as illustrations of suitable compositions and processes encompassed by the present invention.

EXAMPLE 1

The following hectograph printing ink composition is formulated and mixed as discussed below:

| Ingredients | Parts by Weight |
| --- | --- |
| Carnauba wax | 14 |
| Lanolin | 15 |
| Statex carbon black | 2 |
| Crystal violet dye particles | 150 |
| Ethyl hydroxyethyl cellulose | 7 |
| Naphtha (Amsco 460) | 180 |
| Xylene | 25 |

The carnauba wax may be introduced as particles formed by grinding solid carnauba wax alone or together with a portion of the naphtha vehicle. Then the carnauba wax particles, lanolin, and 160 parts of the naphtha are heated together, preferably to about 140° F, to form a clear-melt solution to which the dye and carbon black are added. The cellulose binder, xylene and remaining 20 parts of the naphtha are mixed together to form a solution of the binder, which solution is then milled with the cooled dye dispersion to form a printable thixotropic hectograph ink having a smooth texture.

The gradual cooling of the heated wax solution causes the wax to come out of solution in the form of tiny wax particles or crystals which may include an amount of the oleaginous material as softener and which have particle sizes below about 10 microns and preferably below about 5 microns as is controlled by the speed of cooling. The dye crystals remain substantially completely insoluble in the vehicle even at the elevated temperature.

A stencil 10 comprising a negative mask 12 of the desired subject matter, in which the openings 13 comprise mirror-reverses of the desired subject matter, is positioned against the surface of a master sheet 20 and the hectograph ink composition 14 is applied to an impervious edge of the mask and is drawn across the mask by a conventional squeegee 15 having a flexible rubber blade with a straight edge of sufficient length to sweep the full length or width of the stencil. This forces the ink through the openings 13 and onto the surface of the master sheet 20 in the form of mirror-reverse images 21 of the ink composition.

Next the thus-imaged master sheet is separated from the stencil sheet, and a succession of fresh master sheets can be positioned against the same stencil and imaged in the same manner to produce duplicate master sheets, if desired, since the ink vehicle has a low volatility and the ink will not dry on the silk screen and plug it.

Each printed master sheet is immediately placed under the influence of infrared radiation or heat to evaporate the volatile naphtha and xylene and fuse the meltable waxy particles to form the final master sheet carrying fused hectograph images 31. Images 31 are sharp and clear, free of halos, smooth and relatively clean to the touch, and capable of producing excellent copies in the spirit duplicating process.

EXAMPLE 2

The following ink formulation is formulated and mixed as discussed below:

| Ingredients | Parts by Weight |
| --- | --- |
| Carnauba wax | 15 |
| Lanolin | 15 |
| Mineral oil | 10 |
| Peerless carbon black | 3 |
| Crystal violet dye particles | 120 |
| Ethyl cellulose | 15 |
| Xylene | 30 |
| Mineral spirits | 145 |

The carnauba wax is mixed, preferably at elevated temperatures, with the lanolin and mineral oil and added to the major amount of the volatile vehicle mixture containing the dye and carbon black, causing the wax to reach a dispersed phase on cooling. The cellulose binder is separately dissolved in the remainder of the solvent mixture and the binder solution and cooled dye dispersion are milled together to form a printable, semi-solid hectograph ink composition which is printed and fused in the manner outlined in Example 1 to produce similar excellent master sheets.

The ink compositions of the present invention are particularly adapted for use in the silk screen printing process, using conventional screens such as those having 180 or 160 lines per inch but coarser or finer meshes may be used. However other open stencils can be used instead of silk screens, where appropriate, and if desired the present inks can be printed directly using relief or intaglio printing plates.

The present thixotropic hectograph ink compositions are unique with respect to their resistance to forming dye-containing halos on the master sheet due to the fact that the fused images are substantially free of dissolved dye and of flowable oils. For this reason the present master sheets preferably are transparent or sufficiently translucent that the mirror-reverse hectograph images on the face of the master can be proofread through the back of the master. This alleviates the necessity of applying corresponding direct-reading images on the back of the master. Furthermore an imaged transparent plastic film master can be used as a projection transparency to project the hectograph images as sharp, clear images devoid of the dyed halos which accompany prior hectograph compositions containing liquid dye solvents such as castor oil. The present images also are resistant to melting under the heat generated by the projection lamp whereas prior hot-melt compositions contain lower melting waxes and melt and spread when exposed to a projection lamp for a few minutes.

It is noted that impermeable master sheets and foundations, such as plastic films, can be used according to the present invention because the present compositions set by fusion whereas prior hot-melt and solvent compositions set by cooling or evaporation of the solvent and, to an important extent, by absorption of a portion of the oils and/or volatile solvent by the foundation. Thus prior hectograph compositions adhere better to paper than to plastic film whereas the present compositions adhere equally well to plastic film.

A further advantage of the present hectograph compositions which include an infrared radiation-absorbing material is that such compositions provide imaged master sheets which are thermographically-reproducible by means of the conventional infrared radiation copying systems. Most imaged hectograph master sheets are not thermographically-reproducible since such compositions are substantially free of materials capable of absorbing substantial amounts of infrared radiation. This advantage is quite important where the present master sheets are used in book form for educational purposes and where one or more thermal copies may be desired for record purposes.

According to another embodiment, the present hectograph ink compositions can be printed onto a web to form full or spot carbons since the fused composition, while resistant to spreading during ordinary handling, is pressure-transferable. Thus the composition may be applied to a full or sectional printing roller in conventional manner, printed onto a web of paper or plastic film and exposed to infrared radiation to evaporate the volatile vehicle and fuse the wax particles. The fused composition is excellent for spot carbon use because the composition can be printed and fused to provide sharp, clean spot hectograph applications which will not bleed dyestuff onto adjacent areas of the foundation and which resist staining adjacent sheets in the absence of applied imaging pressure.

However it is preferred to apply a conventional tacky supercoating over the transfer layer in order to improve its frangibility and its bonding properties with respect to a copy sheet. The supercoating, which may be coated but preferably is printed over the hectograph composition, may be a hot-melt composition comprising a tacky wax such as paraffin and/or a tacky resin such as polyisobutylene.

While most of the present compositions are thixotropic because of the nature and proportions of the basic ingredients, as is the case with the compositions of Examples 1 and 2 hereof, it is sometimes necessary in the case of compositions containing a high amount of the volatile solvent, i.e. 70% to 80% by weight, to include a conventional thickening agent such as a fumed microporous silica available under the trademark Cab-o-sil or a treated bentonite clay useful in organic solvent systems and available under the trademark Bentone. Generally an amount equal to from 1% to 5% of the total weight of the composition is sufficient to render the composition thixotropic provided the other ingredients are present in the specified amounts.

While it is preferred to produce the present compositions by dissolving the hard wax together with the semi-solid ingredient and the oil, if present, at elevated temperatures and then causing the hard wax to precipitate out of solution on cooling when the wax solution is mixed with the bulk of the solvent and the dye, it is also possible to produce the present compositions in the cold by milling the hard wax and other ingredients in the volatile solvent to reduce the wax to the desired particle size.

Variations and modifications may be made within the scope of the claims and portions of the improvements may be used without others.

We claim:

1. Thixotropic semi-solid hectograph printing ink which is substantially free of dissolved hectograph coloring matter comprising from about 30% to 80% by weight of a liquid vehicle consisting of at least one volatile organic liquid vehicle having a boiling point between about 200° F and 460° F and having a solids content of from about 70% to 20% by weight comprising:
   a. from about 50% to 85% by weight of the solids content of dispersed, finely-divided, undissolved spirit-soluble hectograph coloring matter which is substantially completely insoluble in said liquid vehicle,
   b. from about 5% to 20% by weight of the solids content of dispersed, finely-divided, hard wax particles having a melting temperature between about 140° F and 300° F,
   c. from about 2% to 15% by weight of the solid content of film-forming binder material which is at least partially soluble in said liquid vehicle, the weight of said film-forming binder material present being less than the weight of said hard wax particles present in said ink, and
   d. from about 5% to 20% by weight of the solids content of a non-drying, semi-solid, oleaginous material which is at least partially incompatible with the hard wax and which has a melting point below about 185° F, substantially all of the dispersed solids in said ink being less than 10 microns in size and said ink being capable of being printed and dried and fused at elevated temperatures to provide a clean, rub-resistant, stable duplicating composition.

2. Hectograph printing ink according to claim 1 in which the solid content comprises from about 0.1% to 5% by weight of a material capable of absorbing substantial amounts of infrared radiation.

3. Hectograph printing ink according to claim 1 comprising naphtha vehicle, hectograph dyestuff, carnauba wax particles, cellulosic binder material and lanolin.

4. Process for preparing thixotropic, semi-solid hectograph printing ink which is substantially free of dissolved hectograph coloring matter and which is capable of being printed and dried and fused at elevated temperatures to provide a clean, rub-resistant, stable duplicating composition comprising the steps of:
   a. preparing a dispersion of from about 5% to 20% by weight, based upon the total solid content, or hard wax particles having a melting temperature between about 140° F and 300° in a liquid vehicle consisting of a volatile organic liquid vehicle having a boiling point between 200° F and 460° F, said vehicle containing from about 5% to 20% by weight, based upon the total solids content, of a non-drying semi-solid, oleaginous material which is at least partially incompatible with said and has a melting point below about 185° F,
   b. mixing from about 50% to 90% by weight, based upon the total solids content, of finely-divided solid particulate spirit-soluble hectograph coloring matter, which is substantially insoluble in said volatile organic liquid vehicle, with said dispersion, c. preparing at least a partial solution of from about 2% to 15% by weight, based upon the total solids content, of film-forming binder material in a volatile organic liquid which has a boiling point between about 200° F and 460° F and which is miscible with the organic liquid of said mixture and is a non-solvent for said hectograph coloring matter, and d. milling said mixture of step (b) with said solution of step (c) to form said ink containing from 30% to 80% by weight of said organic liquid and having a solids content of from about 70% to 20% by weight and in which substantially all of the dispersed solids are less than 10 microns in size and which contains a larger amount by weight of sad hard wax particles than of said film-forming binder material.

5. Process according to claim 4 in which said dispersion of step (a) is formed by heating the hard wax in said vehicle containing said semi-solid oleaginous material to form a clear liquid and then cooling said liquid to cause the hard wax to come out of solution in the form of finely-divided dispersed particles in said volatile organic vehicle.

6. Process for printing a hectograph imaging composition in image form onto a master sheet comprising the steps of:

A. providing a thixotropic semi-solid hectograph printing ink which is substantially free of dissolved hectograph coloring matter comprising from about 30% to 80% by weight of a liquid vehicle consisting of at least one volatile organic liquid vehicle having a boiling point between about 200° F and 460° F and having a solids content of from about 70% to 20% by weight comprising:

a. from about 50% to 85% by weight of the solid content of dispersed, finely-divided, undissolved spirit-soluble hectograph coloring matter which is substantially completely insoluble in said liquid vehicle, b. from about 5% to 20% by weight of the solids content of dispersed, finely-divided, hard wax particles having a melting temperature between about 140° F and 300° F, c. from about 2% to 15% by weight of the solids content of film-forming binder material which is at least partially soluble in said liquid vehicle, the weight of said film-forming binder material present being less than the weight of said hard wax particles present in said ink, and d. from about 5% to 20% by weight of the solids content of a non-drying, semi-solid, oleaginous material which is at least partially incompatible with the hard wax and which has a melting point below about 185° F, substantially all of the dispersed solids in said ink being less than 10 microns in size and said ink being capable of being printed and dried and fused at elevated temperatures to provide a clean, rub-resistant, stable duplicating composition, B. printing said hectograph printing ink through an imaged stencil sheet having image wise openings therein onto the surface of a flexible master sheet foundation to form printed images thereon, and C. heating said printed images to evaporate the liquid vehicle and fuse the waxy particles to form dry, smooth images which are sharp, clean to the touch, rub-resistant and stable.

7. Process according to claim 6 in which the ink comprises a material capable of absorbing high amounts of infrared radiation, and heating of the printed ink is effected by exposure to radiation rich in infrared.

8. Process according to claim 6 in which the solids content of the printing ink comprises a major amount by weight of hectograph dyestuff and minor amounts by weight of carnauba wax, semi-solid oleaginous material and cellulosic film-forming binder material.

9. Process according to claim 6 in which the master sheet is sufficiently translucent that the images can be read through the master sheet.

* * * * *

UNITED STATES PATENT AND TRADEMARK OFFICE
CERTIFICATE OF CORRECTION

PATENT NO. : 4,042,401

DATED : August 16, 1977

INVENTOR(S) : Newman, et al (Douglas A. Newman-Robert T. Emerson)

It is certified that error appears in the above-identified patent and that said Letters Patent are hereby corrected as shown below:

Column 2, line 3, after "polyester" insert---,---;
Column 4, line 63, the word "mean" should be---means---;
Column 6, Line 68, after "hot-melt" insert the word---wax---;
Column 7, line 46, after "hot-melt" insert the word---wax---;
Column 8, line 26, the word "solid" should be---solids---;
Column 8, line 56, the word "solid" should be---solids---;
Column 8, line 56, the word "or" should be---of---; Column 8, line 64, after "said" insert the word---wax---; Column 9; line 18, the word "sad" should be---said---; Column 9, line 40, the word "solid" should be---solids---.

*Signed and Sealed this*

*Twenty-ninth* Day of *November 1977*

[SEAL]

Attest:

RUTH C. MASON
*Attesting Officer*

LUTRELLE F. PARKER
*Acting Commissioner of Patents and Trademarks*